United States Patent [19]

Heller et al.

[11] Patent Number: 4,563,702

[45] Date of Patent: Jan. 7, 1986

[54] VIDEO SIGNAL SCRAMBLING AND DESCRAMBLING SYSTEMS

[75] Inventors: Jerrold A. Heller; Woo H. Paik, both of San Diego, Calif.

[73] Assignee: M/A-COM Linkabit, Inc., San Diego, Calif.

[21] Appl. No.: 498,875

[22] Filed: May 27, 1983

[51] Int. Cl.[4] .......................... H04N 7/16; H04L 9/00
[52] U.S. Cl. .................................. 358/119; 178/22.05
[58] Field of Search ..................... 358/119; 178/22.04, 178/22.05, 22.06

[56] References Cited

U.S. PATENT DOCUMENTS

| | | | |
|---|---|---|---|
| 3,872,503 | 3/1975 | Shutterly | 360/8 |
| 4,022,972 | 5/1977 | Pires | 358/124 |
| 4,070,693 | 1/1978 | Shutterly | 358/123 |
| 4,221,931 | 9/1980 | Seiler | 179/1.5 R |
| 4,266,243 | 5/1981 | Shutterly | 358/121 |
| 4,405,942 | 9/1983 | Block et al. | 358/119 |

*Primary Examiner*—S. C. Buczinski
*Assistant Examiner*—Linda J. Wallace
*Attorney, Agent, or Firm*—Baker, Maxham, Callan & Jester

[57] ABSTRACT

Systems for scrambling and descrambling video information lines. The scrambling system includes a memory; a storage system for sequentially storing groups of four video information lines in the memory; and a retrieval means for forming groups of four scrambled video information lines by retrieving the stored video information from the memory in a sequence different from the sequence within the stored group in which the information was stored. The retrieval system forms the scrambled video information lines by retrieving a portion of a first stored video information line from a first position therein to form a portion of a first scrambled video information line occupying a second position therein; retrieving a portion of the first stored video information line from the corresponding second position therein to form a portion of a second scrambled video information line occupying a position therein other than the corresponding second position; and forming the portion of the first scrambled video information line occupying the corresponding first position therein by retrieving a portion of a stored video information line other than the first stored video information line from a position therein other than the corresponding first position. The sequence of formation of the scrambled lines, the respective sizes of the retrieved portions, and the combinations of stored video lines within the stored groups for forming the first and second scrambled video lines are varied from one group to the next in response to a keystream of control bits. The descrambling system functions conversely to the scrambling system.

25 Claims, 8 Drawing Figures

VIDEO SIGNAL SCRAMBLING AND DESCRAMBLING SYSTEMS

BACKGROUND OF THE INVENTION

The present invention generally pertains to video signal processing and is particularly directed to improved video signal scrambling and descrambling systems.

One technique for scrambling video signals is described in U.S. Pat. No. 4,070,693 to Shutterly. In accordance with the technique described therein, video information is scrambled by storing a video information line in a memory and then forming a scrambled video information line by retrieving the video information from the memory in a sequence different from the sequence within the line in which the information was stored. The portion at the beginning position of the stored video information line is retrieved at the last position of the scrambled video information line and the portion at the last position of the stored video information line is retrieved at the beginning position of the scrambled video information line. The respective lengths of the retrieved portions are varied from one line to the next in response to a randomly generated coded control signal.

SUMMARY OF THE INVENTION

The present invention provides more complex scrambled video signal line formation and thereby better scrambles the video signal.

In one aspect, the present invention provides a system for scrambling video information lines. The scrambling system includes a memory; a storage system for sequentially storing groups of a plural predetermined number of the video information lines in the memory; and a retrieval system for forming a corresponding number of scrambled video information lines by retrieving the stored video information from the memory in a sequence different from the sequence within the stored group in which the information was stored. The retrieval system forms the scrambled video information lines by retrieving a portion of a first stored video information line from a first position therein to form a portion of a first scrambled video information line occupying a second position therein; retrieving a portion of the first stored video information line from the corresponding second position therein to form a portion of a second scrambled video information line occupying a position therein other than the corresponding second position; and forming the portion of the first scrambled video information line occupying the corresponding first position therein by retrieving a portion of a stored video information line other than the first stored video information line from a position therein other than the corresponding first position. Preferably the retrieval system varies the sequence of formation of the scrambled lines from one retrieved group to the next; and the retrieval system also varies the combinations of stored video information lines within the stored groups for forming the first and second scrambled video information lines from one group to the next. The retrieval system controls the formation of the scrambled lines in response to a keystream. Each frame of the keystream includes a first set of control bits for designating combinations of stored video information lines as sources for corresponding combinations of scrambled video information lines in the formed group, and a second set of control bits for designating the sequence of formation of the scrambled video information lines in the formed group. Preferably the keystream further includes a third set of control bits for designating the respective lengths of the retrieved portions in each combination of stored video information lines in response to which, the respective lengths are varied from one combination to the next by the retrieval system.

In another aspect, the present invention provides a system for descrambling scrambled video information lines. The system includes a memory; a storage system for sequentially storing groups of a plural predetermined number of the scrambled video information lines in the memory; and a retrieval system for sequentially forming groups of a corresponding number of descrambled video information lines by retrieving the stored video information from the memory in a sequence different from the sequence within the stored group in which the information was stored. The retrieval system forms the descrambled video information lines by retrieving a portion of a first scrambled video information line from a first position therein to form a portion of a first descrambled video information line occupying a second position therein; retrieving a portion of the first scrambled video information line from the corresponding second position therein to form a portion of a second descrambled video information line occupying a position therein other than the corresponding second position, and forming the portion of the first descrambled video information line occupying the corresponding first position therein by retrieving a portion of a scrambled video information line other than the first scrambled video information line from a position therein other than the corresponding first position. The retrieval system, controls the formation of the descrambled lines in response to a keystream. Each frame of the keystream includes a first set of control bits for designating combinations of descrambled video information lines as destinations for information stored in corresponding combinations of scrambled video information lines in the stored group. The keystream that is used for descrambling the scrambled video information signal is identical to the keystream that is used for scrambling the original video information signal. Accordingly, the keystream preferably further includes a second set of control bits for designating the sequence of retrieval of information from the scrambled video information lines in the stored group and a third set of control bits for designating the respective lengths of the retrieved portions in the combinations of descrambled video information lines.

Additional features of the present invention are described in relation to the description of the preferred embodiment.

DESCRIPTION OF THE PREFERRED EMBODIMENT

Figure 1:
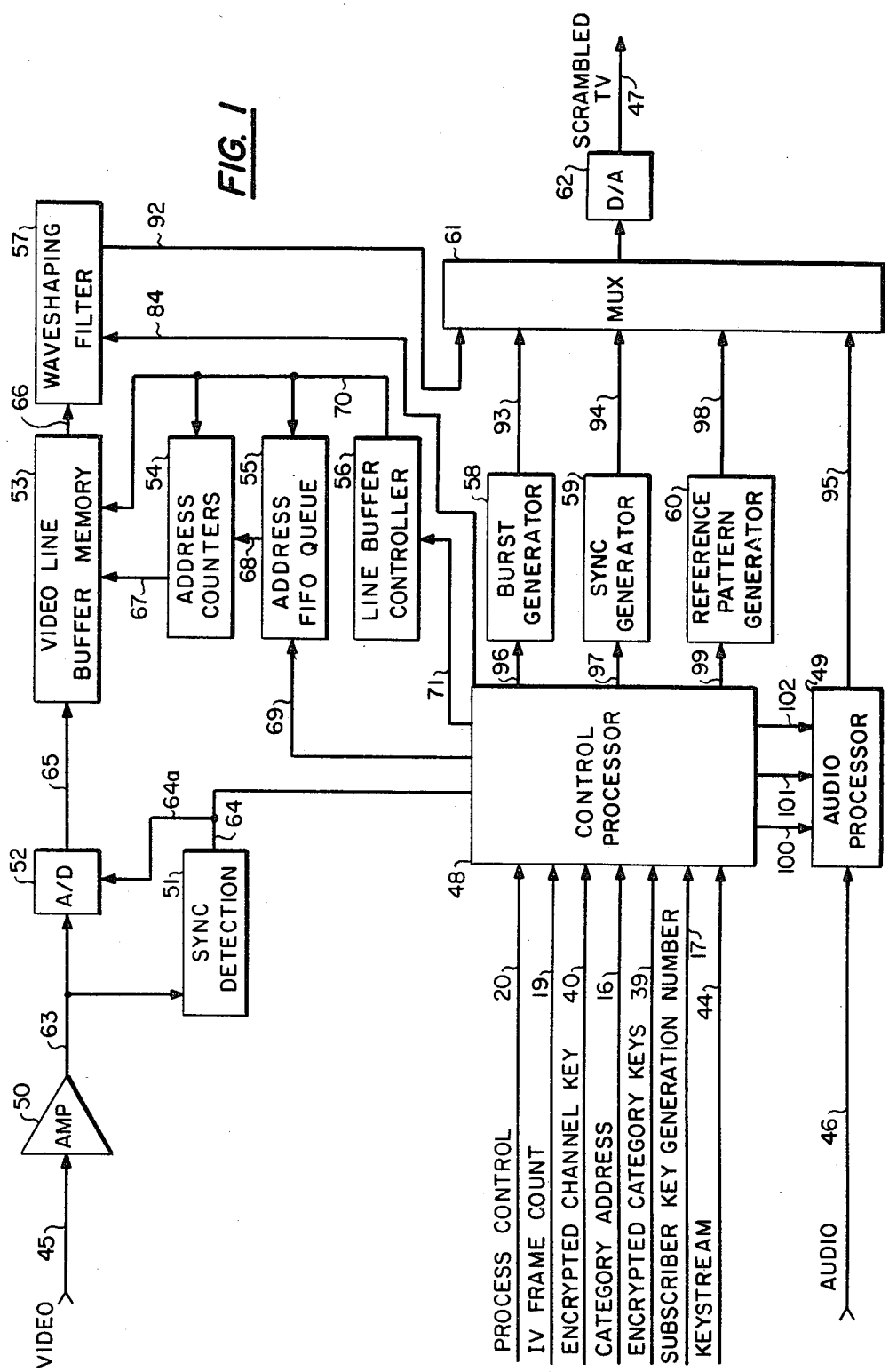
FIG. 1 is a block diagram of a video signal scrambling system in accordance with the present invention.

The preferred embodiments of the video scrambling and descrambling systems described herein are used in the preferred embodiment of the subscription television system is described in a co-pending U.S. patent application Ser. No. 498,800 by Klein S. Gilhousen and Charles F. Newby, Jr. filed May 27, 1983 for "Key Signal Encryption and Distribution System for Controlling Scrambling and Selective, Remote Descrambling of Television Signals," wherein they are referred to as a "scrambler signal processor" and a "descrambler signal processor", respectively. The same reference numerals are used for like components described both therein and herein.

Referring to FIG. 1, the preferred embodiment of the video scrambling system includes a control processor 48, an audio processor 49, a video amplifier 50, a sync detection circuit 51, an analog-to-digital (A/D) converter 52, a video line buffer memory 53, address counters 54, an address FIFO (first-in/first-out) queue 55, a line buffer controller 56, a wave shaping filter 57, a burst generator 58, a sync generator 59, a reference pattern generator 60, a multiplier (MUX) 61 and a digital-to-analog (D/A) converter 62. The operation of the control processor 48 is controlled by control signals provided on line 20 by a control computer (not shown).

Figure 2:
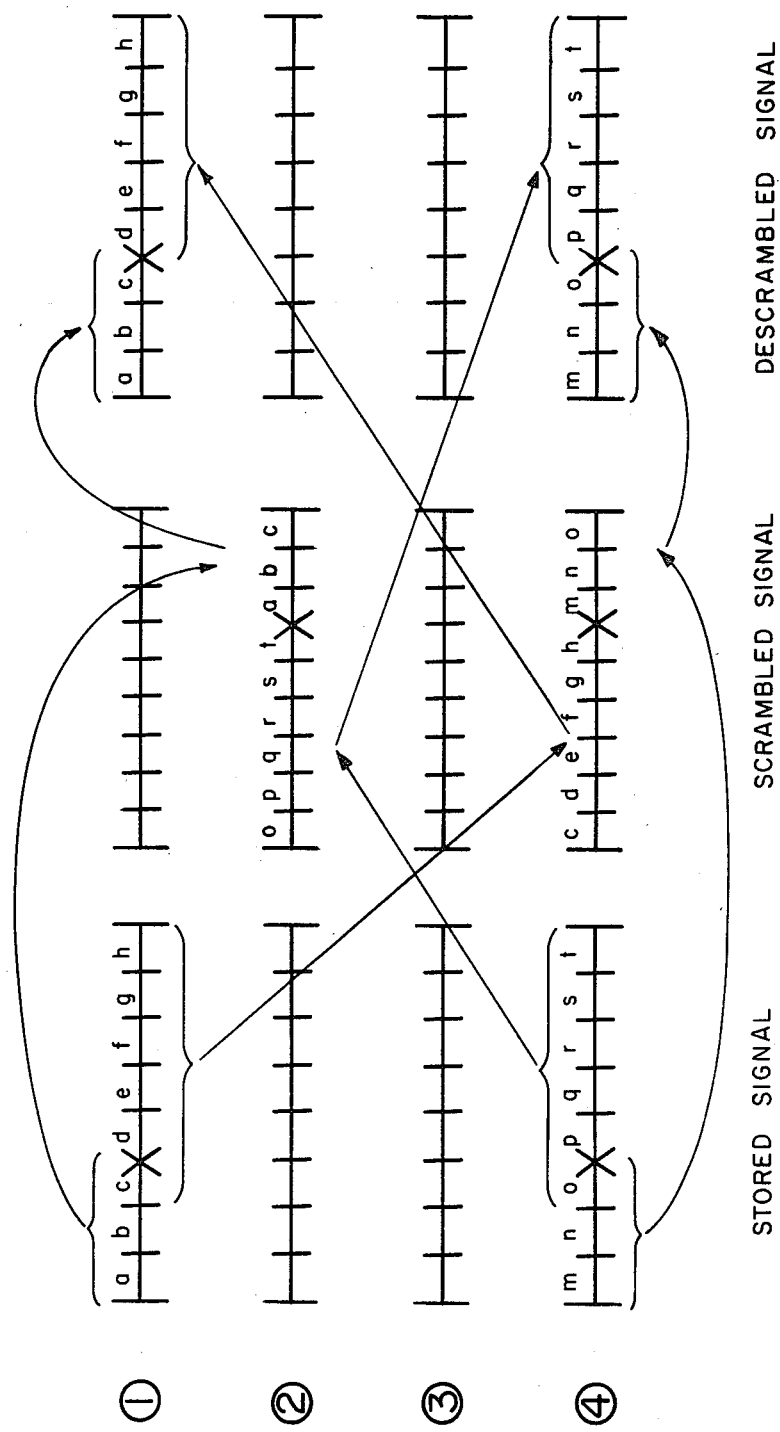
FIG. 2 is a diagram showing an explemplary relationship between stored video signal lines, scrambled video signal lines and descrambled video signal lines.

A video signal on line 45 is scrambled by the video scrambling system of FIG. 2 in accordance with one portion of each frame of a unique received keystream on line 44 from a scrambler key distribution system (not shown). The scrambler key distribution system is described in the aforementioned patent application by Gilhousen et al, the entire disclosure of which is incorporated herein by reference thereto.

The video amplifier 50 amplifies the video signal on line 45 and filters the same to remove any extraneous or harmonic signals. The amplified and filtered video signal is provided on line 63 to the A/D converter 52 and the sync detection circuit 51. The sync detection circuit 51 detects the vertical and horizontal synchronization signals in the video signal on line 63 and responds thereto by providing synchronization control and clocking signals on line 64 to the control processor 48. Among these clocking signals is a 14.32 MHz signal, which is at four times the color subcarrier frequency of an NTSC video signal, and which is also provided by the sync detection circuit 51 on line 64a to clock the A/D converter 52.

The A/D converter 52 converts the amplified video signal on line 63 into a digital video information signal on line 65 at the sampling rate of 14.32 MHz to provide 910 8-bit samples per video line. The active video information corresponds to the 744 samples in each line.

The video line buffer memory 53 stores the digital video signal on line 65 in four groups of four video information lines each. Each stored video information line includes 744 8-bit samples of active video information. A first group includes four consecutive odd-numbered lines from the same video field. A second group includes the next four consecutive odd numbered lines from the same video field. A third group includes four consecutive even-numbered lines from the same video field, and the fourth group includes the next four consecutive even-numbered lines from the same video field. One group of odd-numbered lines is stored in the memory 53 while the information from the previously-stored group of odd-numbered lines is retrieved from the memory 53 to form a four-line group of odd-numbered scrambled video information lines on line 66. Likewise, one group of even-numbered lines is stored in the memory 53 while the information from the previously stored group of even-numbered lines is retrieved from the memory to form a four-line group of even-numbered scrambled video information lines on line 66. Video scrambling is accomplished by retrieving the active video information from the memory in a sequence different from that in which it was stored.

The address counters 54 provide the respective addresses on line 67 to the memory 53 for storing and retrieving video information. These addresses are provided to the address counters 54 on line 68 via the address FIFO queue 55 and line 69 from the control processor 48 in accordance with the unique keystream provided to the control processor 48 on line 44.

The line buffer controller 56 provides clocking and control signals on lines 70 for synchronizing the operations of the address FIFO queue 55, the address counters 54 and the memory 53 in accordance with clocking and synchronization control signals provided on line 71 by the control processor 48. The control processor 48 provides the clocking and synchronization control signals on lines 71 in response to the clocking and synchronization control signals received on lines 64 from the sync detection circuit 51.

FIG. 2 illustrates an exemplary embodiment of scrambling video information in accordance with the present invention. Scrambling is accomplished within four-line groups. Two control bits of the keystream on line 44 designate which lines within a given, stored four-line group are to be paired for forming a corresponding pair of scrambled video information lines. In the embodiment of FIG. 2, lines 1 and 4 make up one pair in the stored group and the other pair in the stored group is made up of lines 2 and 3. Although each stored active video information line actually contains sixty-two twelve-sample segments, in FIG. 2 each stored line is shown as having only eight segments for simplicity of illustration. In the example of FIG. 2, the segments of stored line 1 are designated "a" through "h", and the segments of stored line 4 are designated "m" through "t". The relative lengths of the retrieved portions in each pair of scrambled lines is designated by six control bits in the keystream, which indicate a cutpoint "X" as being after a given number of segments from the beginning of the line.

Another five control bits of the keystream on line 44 designate the sequence within a four-line group in which the scrambled lines are formed. Twenty-four different sequences are possible. Thus nineteen bits of the keystream are used every four video line times to select one of $3 \times 62 \times 24 = 276{,}768$ possible scrambling patterns. Descrambling requires local generation of the identical keystream in the descrambler. In the preferred embodiment, the control processor 48 is programmed to provide retrieval addresses on line 69 to the address FIFO queue 55 in such a sequence that (a) the left portion on one line of a corresponding scrambled pair is retrieved from the right portion of one line of a designated stored pair; (b) the right portion of the one line of the corresponding scrambled pair is retrieved from the left portion of the other line of the designated stored pair; (c) the left portion of the other line of the corresponding scrambled pair is retrieved from the right portion of the other line of the designated stored pair; and (d) the right portion of the other line of the corresponding scrambled pair is retrieved from the left portion of the one line of the designated stored pair. In alternative preferred embodiments, the control processor may be programmed to effect alternative retrieval combinations between the designated stored line pairs and the corresponding scrambled line pairs.

In the example of FIG. 2, scrambled lines 2 and 4 are formed by (a) retrieving a portion consisting of segments a, b and c from the left end of stored line 1 to form the right end of scrambled line 2; (b) retrieving a portion consisting of segments c, d, e, f, g and h from the right end of stored line 1 to form the left end of scrambled line 4; (c) retrieving a portion consisting of segments m, n and o from the left end of stored line 4 to form the right end of scrambled line 4; and (d) retrieving a portion consisting of segments o, p, q, r, s and t from the right end of stored line 4 to form the left end of scrambled line 2. It is noted that the combinations of scrambled lines are formed to include overlapping segments from the stored lines, i.e. segment c from stored line 1 and segment o from stored line 4. This procedure reduces the possibility of overshoot and makes it more difficult for a pirate attempting to descramble the scrambled signal to be able to determine the location of the cutpoint X.

To further obscure the location of the cutpoint X, the waveshaping filter 57 adjusts the values of the adjacent extremities of the retrieved portions of each scrambled line to smooth over any fast rise-time edges. For example, in scrambled line 2 shown in FIG. 2, the values of the adjacent extremities of segments t and a are adjusted.

Figure 3:
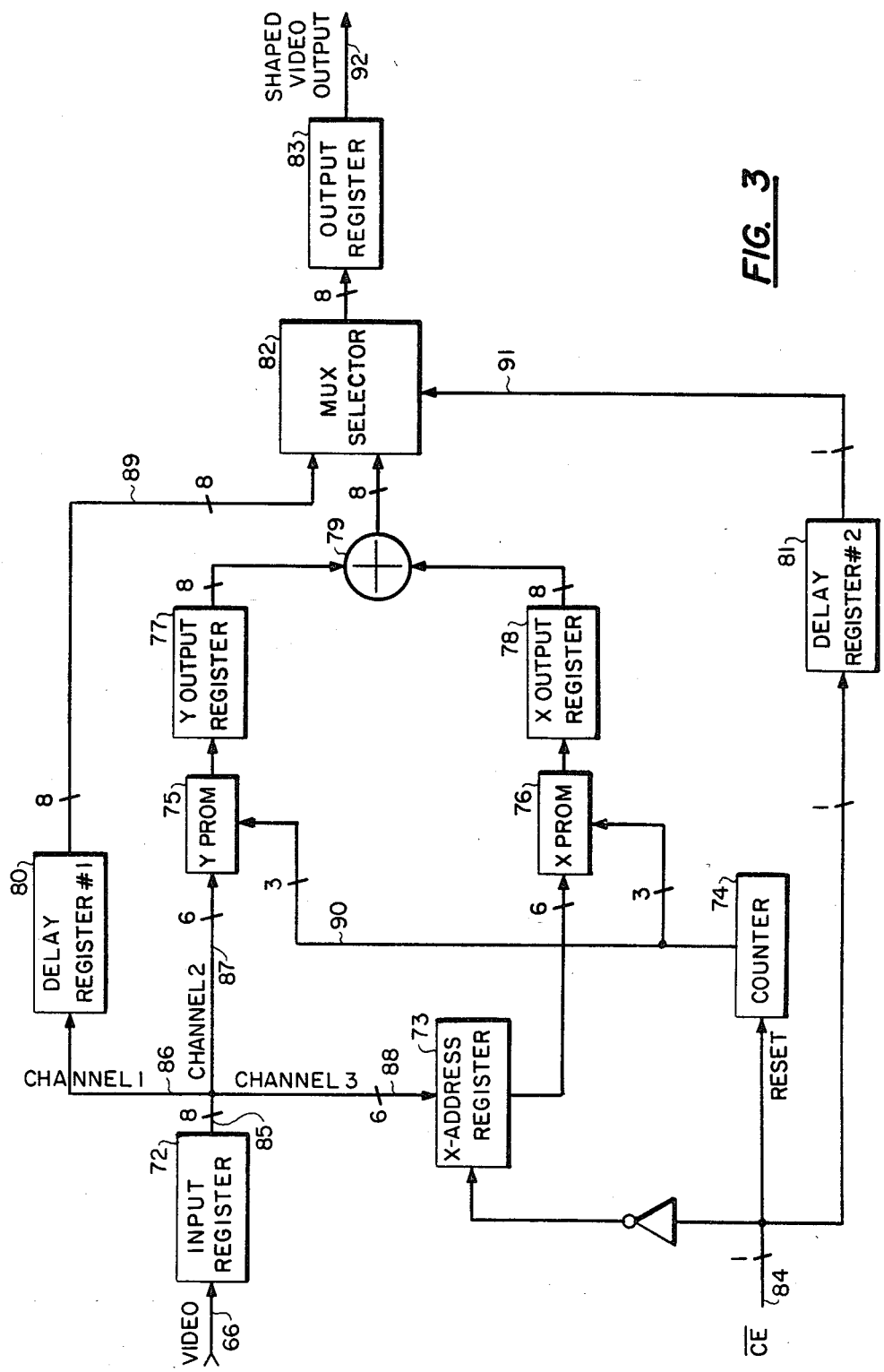
FIG. 3 is a block diagram of the waveshaping filler included in the video processor of FIG. 2.

Referring to FIG. 3, the waveshaping filter 57 includes an input register 72, an X-address register 73, a counter 74, a Y PROM (programmable read only memory) 75, an X PROM 76, a Y output register 77, an X output register 78, a binary adder 79, a first delay register 80, a second delay register 81, a multiplexer 82 and an output register 83.

The waveshaping filter of FIG. 3 provides a smooth transition between two eight-bit samples in a digital data stream separated by six clock periods. The process involves generating a plurality of interpolated values $I_n$ between the two samples X and Y in different adjacent retrieved portions of each scrambled line and inserting samples having the interpolated values in the stream of data between the X and Y samples.

These interpolated values $I_n$ effectively smooth out any abrupt differences between the X and Y samples. Start values can be greater in value than stop values, or vice versa.

The concept involved in accomplishing the waveshaping is the implementation of the algebraic function:

$$I_n = [(T-n)/T]X + (n/T)Y \quad \text{(Eq. 1)}$$

Where T is the total number of clock cycles between start and stop samples; and N is the positional number of the inserted interpolated sample. The total number of inserted samples is $T-1$.

The waveshaping filter of FIG. 3 implements a special case of Equation 1, wherein $$I_n = a_n X + b_n Y_n \quad \text{(Eq. 2)}$$

Where $Y_n$ = the comparison sample value.
For a specific case with 6 samples, $$a_n = (6-n)/6, \text{ and}$$

$$b_n = n/6$$

The resulting $I_n$ value is a linearly interpolated value based on the difference between the selected X and Y sample values. Equation 2 is a special case of the basic linear series of values (Equation 1) resulting from taking a fractional part of the difference between the X+Y sample values, and adding n times this fractional part successively to the X sample value to obtain each interpolated sample value $I_n$. When the Y value is not the stop value Y but the actual $Y_n$ sample occurring where the interpolated value needs to be inserted the linearity of the interpolated value will vary as the Y sample value deviates from the stop sample value Y.

The waveshaping filter 57 inserts the interpolated values $I_n$ to smooth out the scrambled video signal on line 66 only during a five-sample period overlapping the transition between adjacent retrieved portions of each scrambled line in response to a control signal provided on line 84 by the control processor during the five-cycle period.

Referring to FIG. 3, each eight-bit sample on line 66 is clocked into the input register 72. The eight bits are output from the input register 72 onto line 85, from which they are routed in through different three channels on lines 86, 87 and 88. All eight bits are routed over channel 1 (line 86) through the first delay register 80, whereby they are delayed by one sample clock period and provided on lines 89 to the multiplexer 82.

The six most significant bits are routed over channel 2 (line 87) to address the six most-significant-bit positions of the address of the Y PROM 75. The three least-significant-bit positions of the address of the Y PROM 75 are addressed by a count signal provided on line 90 from the counter 74. The counter 74 is a 0–4 counter which is advanced at the sampling rate of 14.32 MHz during the five-sample period indicated by the control signal on line 84.

During the first sample period while the count on lines 90 is 000, the Y PROM provides to the Y output register 77 an 8-bit signal having a value of one-sixth the value of $Y_1$ as determined by the six bits on line 87. The output values from the Y-PROM during the subsequent sample periods are two-sixths $Y_2$, three-sixths $Y_3$, four-sixths $Y_4$ and five-sixths $Y_5$, respectively.

The six most significant bits of the signal on line 85 from the output register 72 are provided over channel 3 (line 88) to the X-address register 73. The six most significant bits of start sample X are stored in the X-address register 73 in response to the leading edge of the five-sample duration control signal on line 84 and remain stored therein until the trailing edge of the control signal on line 84 clears the register 73. The contents of the X-address register 73 address the six most-significant-bit positions of the X PROM 76, and the count signal on line 90 provides the address for the three least-significant-bit positions of the X PROM 76.

During the five sample periods, the values of the output signals provided by the X PROM to the X output register 78 are five-sixths X, four-sixths X, three-sixths X, two-sixths X, and one-sixth X.

The binary adder 79 adds the values of the contents of the Y output register 77 and the X output register 78. The second delay register 81 delays the control signal on line 84 to provide a one-sample-period-delayed control signal on line 91.

The multiplexer 82 provides the output from the first delay register 80 to the output register 83 at all times except during the one-sample-period-delayed control signal on line 91, when the multiplexer 82 provides the output from the binary adder 79 to the output register 83.

The value of the output register signal during the transition from the start value X to the stop value Y is shown in Table 1.

TABLE 1

| CONTROL SIGNAL | SAMPLE PERIOD | OUTPUT REGISTER |
|---|---|---|
| 0 | — | $X_{0-1}$ |
| 1 | 000 | X |
| 1 | 001 | $Y_1/6 + 5X/6$ |
| 1 | 010 | $Y_2/3 + 2X/3$ |
| 1 | 011 | $Y_3/2 + X/3$ |
| 1 | 100 | $2Y_4/3 + X/3$ |
| 0 | — | $5Y_5/6 + X/6$ |
| 0 | — | Y |

The waveshaping filter output signal is provided from the output register 83 on line 92.

Referring again to FIG. 1, the scrambled video information lines on line 92 are multiplexed by the multiplexer 61 with a six-cycle sync burst data signal on line 93 from the burst generator 58, a horizontal sync pulse data signal on line 94 from the sync generator 59 and scrambled digital audio signals and control signals on line 95 from the audio processor 49. The operation of the multiplexer 61 is controlled by the control processor 48. The output of the multiplexer 61 is converted to an analog signal by the D/A converter 62 to provide a scrambled TV signal on line 47.

The burst generator 58 provides the six-cycle sync burst data signal on line 93 in response to a control signal on line 96 from the control processor 48. The sync burst component of the signal on line 47 is locked to and at the same frequency and phase as the color burst component of the video signal on line 63 detected by the sync detection circuit 51. If the video program source is monochrome, data for the phase and frequency of the six-cycle burst is provided from a memory in the control processor 48.

The sync generator 59 provides the horizontal sync pulse data signal on line 94 in response to a control signal on line 97 from the control processor 48. A shortened horizontal sync pulse is retained so that the scrambled signal can pass through telephone company equipment, which contains circuitry which clamps on this pulse. Without any horizontal pulse, the telephone company equipment would distort the signal in an unrecoverable manner.

Figure 4A:
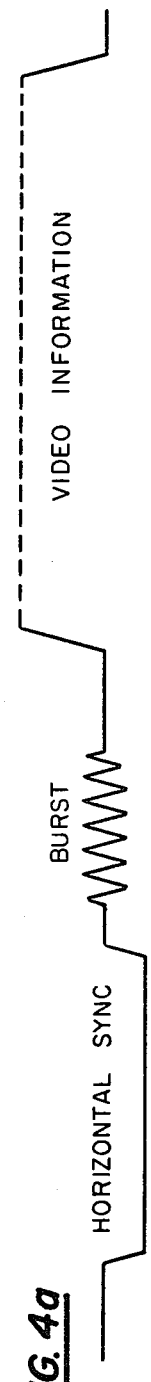
FIGS. 4a, 4b and 4c illustrates the waveforms of various lines of the unscrambled and scrambled video signals.
Figure 4B:
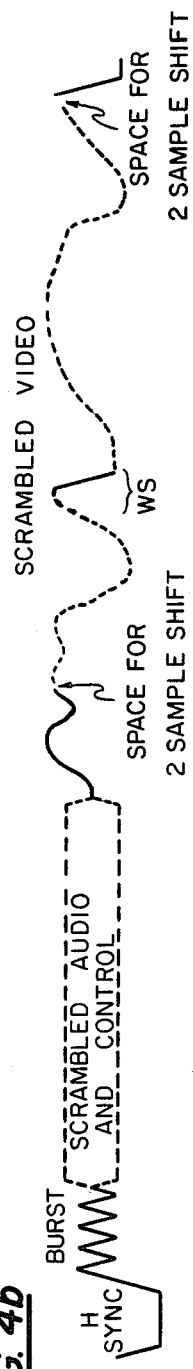

The control processor 48 causes the components of the scrambled TV signal on line 47 to occur during the intervals shown in FIG. 4b with reference to the beginning of the scrambled video line as determined in response to the synchronization control signals received on lines 64 from the sync detection circuit 51. The sequence of the components in an NTSC video signal line are shown in FIG. 4a. The front porch occupies the first 21 sample periods; the horizontal sync pulse occupies sample periods 22 through 79; the breezeway occupies sample periods 80 through 97; the nine-cycle color burst occupies sample periods 98 through 133; the back porch occupies sample periods 134 through 156; and the active video information occupies sample periods 162 through 905. The front build-up occupies sample periods 157 through 161 and the back fall-off occupies sample periods 906 through 910.

In the scrambled TV signal on line 47 shown in FIG. 4b, the horizontal sync pulse occupies sample periods 1 through 18; the 6-cycle sync burst occupies sample periods 19 through 42; the scrambled audio signal and control signals occupy sample periods 43 through 134 and the scrambled video information lines occupy the remaining sample periods. The location of the six-sample period waveshaping interval WS depends upon the location of the cutpoint X in the stored video information line. The front build-up occupies approximately 21 sample periods and the back fall-off occupies approximately five sample periods, with there being variation for a two-sample period shift for scrambling embodiments in which an odd-numbered video signal line is paired with an even-numbered video signal line. Such a scrambling scheme requires less capacity in the buffer memory 53 in that four consecutive odd and even lines can be retrieved while the following four consecutive odd and even lines are stored. However, such scheme results in a two-cycle phase shift which is compensated for to achieve alignment by a two-sample period shift in retrieving the video information from the memory 53. also the length of the front build-up interval will depend in the amount of overlap in the stored video signal line portions retrieved from a single stored line (as shown in FIG. 2).

Figure 4C:

Scrambling does not take place during lines 1 through 9 of each video field. During line 1 of the first video field, the multiplexer 61 causes IRE reference level data signals and a synchronization sequence data signal to be inserted in the scrambled video signal during the sample periods otherwise occupied by the active video information. Video line 1 is illustrated in FIG. 4c. The reference level data and synchronization sequence data signals are provided on line 98 by the reference pattern generator 60 in response to control signals on line 99 from the control processor 48.

The signals on lines 93, 94 and 98 all are digital signals.

Referring to FIG. 4c, the synchronization sequence signal is a 24-bit signal referenced to an IRE reference level of 0 for binary "0" and to an IRE reference level of 60 for binary 1. The synchronization sequence signal occupies sample period 179 through 236. An IRE reference level signal of 40 occupies sample periods 135 through 178; and an IRE reference level signal of 100 occupies sample periods 237 through 284. Sample periods 285 through 910 are at an IRE reference level of 0. One volt equals 140 IRE units. The synchronization sequence signal is used by the descrambler for frame and sample synchronization as well as for control of AGC (automatic gain control) amplifier gain.

Sample periods 135 through 910 of lines 2 through 9 of field one and of lines 1 through 9 of field two are referenced to an IRE reference level of zero.

The audio signal on line 46 is digitized and scrambled by the audio processor 49 in accordance with an audio encryption portion of the keystream received on line 44 by the control processor 48 and passed through to the audio processor on line 100.

A group of control signals including the IV frame count signal on line 19, the encrypted channel key signal on line 40, the category address signal on line 16, the encrypted category key signals on line 39, the subscriber key generation number on line 17 and certain of the process control signals on line 20 intended for the descrambler are provided on line 101 to the audio processor 49, which multiplexes the group of control signals on line 101 with the scrambled audio signals. The audio processor time-compresses each interval of the scrambled audio signal corresponding to the duration of a video signal line into an interval corresponding to an NTSC video signal horizontal sync pulse. The audio processor 49 provides the multiplexed control signals and time-compressed scrambled audio signal on line 95 to the multiplexer 95 only during sample periods 43 through 134. This interval corresponds to the interval of the horizontal sync pulse in an NTSC video signal line (FIG. 4a). The time-compression and timing functions of the audio processor 49 are synchronized and clocked in response to synchronization control and timing signals provided by the control processor on line 102 in response to synchronization control and timing signals received by the control processor 48 on lines 64 from the sync detection circuit 51 upon detecting the color burst in the video signal on line 63. If the video signal on line 63 is derived from a monochrome program source, the control processor 48 derives the synchronization and control signals provided on line 102 from internally stored phase and frequency data and from the detection of the horizontal sync pulses by the sync detection circuit 51.

The preferred embodiment of the audio processor 49 is described in more detail in a co-pending U.S. patent application Ser. No. 498,824 by Jerrold A. Heller, Woo H. Paik and Gordon Kent Walker filed May 27, 1983 for "Digital Audio Scrambling System With Error Conditioning", the entire disclosure of which is incorporated herein by reference.

The scrambled TV signal on line 47 is broadcast to the descrambling system in the subscription television system. The preferred embodiment of the descrambling system descrambles the scrambled video signal in accordance with the unique encryption keystream to provide a descrambled video signal.

Figure 5:
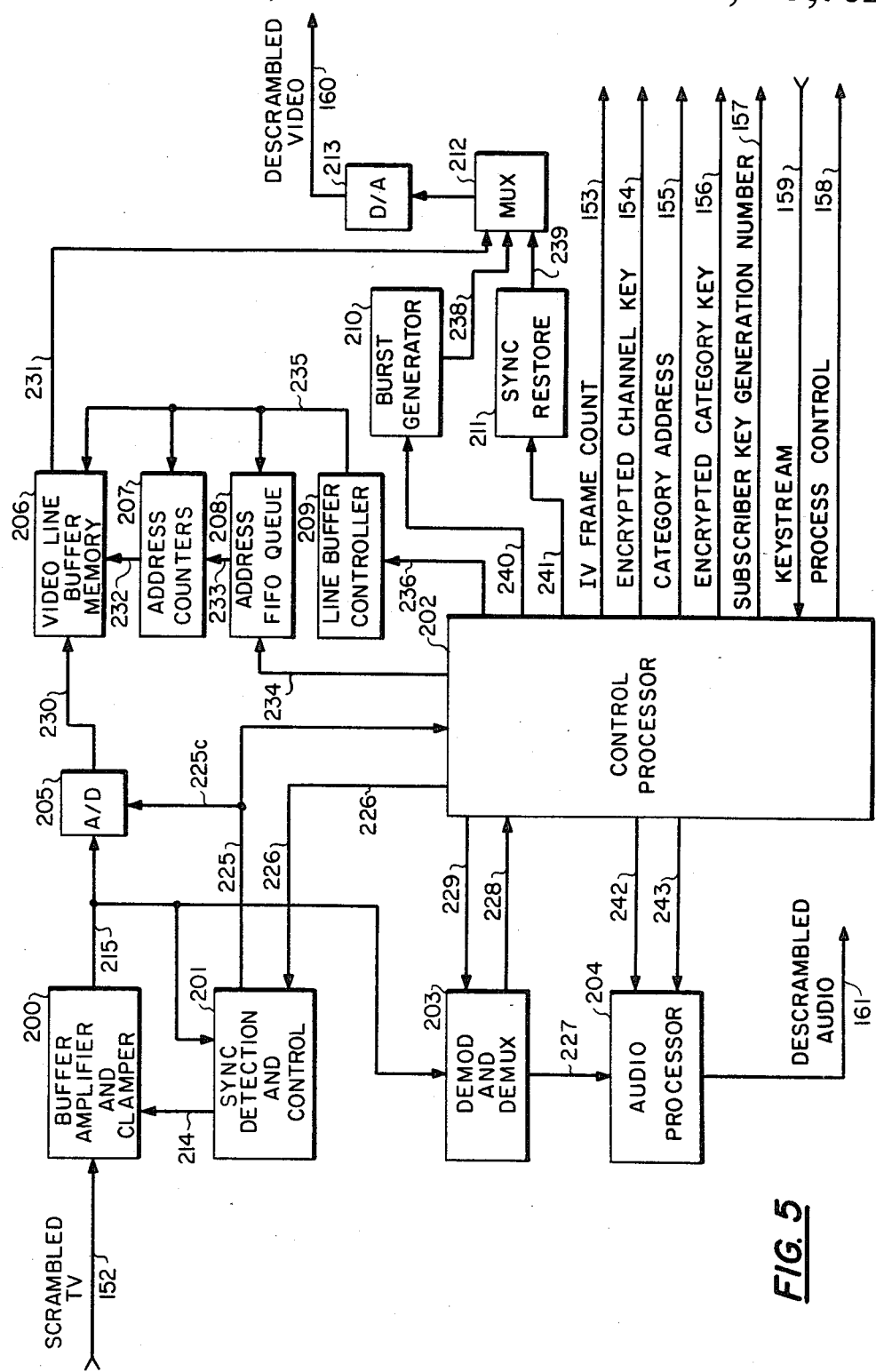
FIG. 5 is a block diagram of a video signal descrambling system in accordance with the present invention.

Referring to FIG. 5, the preferred embodiment of the video descrambling system includes a buffer amplifier and clamper circuit 200, a sync detection and control circuit 201, a control processor 202, a demodulator and demultiplexer circuit 203, an audio processor 204, an A/D converter 205, a video line buffer memory 206, address counters 207, an address FIFO queue 208, a line buffer controller 209, a burst generator 210, a sync restore generator 211, a multiplexer 212 and a D/A converter 213. The buffer amplifier and clamper circuit 200 provides an interface for receiving the incoming scrambled video signal on line 152. The buffer amplifier and clamper circuit 200 includes an automatic gain control (AGC) amplifier, a low pass filter, a first operational amplifier, a sample and hold amplifier, and a second operational amplifier.

The range of the composite video output level of cable video receivers is between 100 mV and 1 volt peak-to-peak, and the AGC amplifier is used to accommodate the wide range of the incoming video level. The gain of the AGC amplifier is automatically adjusted by a gain control signal (not shown) from the control processor 202. Following the AGC amplifier, the lowpass filter provides anti-aliasing filtering by passing only useful video components and rejecting any subcarrier components. Preferably the lowpass filter is a 5-pole, elliptic-function lowpass filter with one stage of delay equalization. This filter provides adequate filtering with a minimal amount of degradation inside the video passband.

The clamper portion of the circuit 200 includes the sample and hold amplifier and the first and second operational amplifiers. The output of the low pass filter is connected to the non-inverting input of the first operational amplifier.

The sample-and-hold amplifier samples the output signal from the first operational amplifier at every color burst interval (approximately 2 microsec.). The sample and hold amplifier is gated by a gate signal on line 214 from the synchronization and control circuit 201, which is described below with reference to FIG. 6. The sampled signal is provided to the inverting input of the second operational amplifier which has a capacitor connected between its inverting input and output so as to function as an integrator. The second operational amplifier compares the sampled signal with a fixed DC level reference signal provided to its noninverting input and integrates the error components. The output of the second operational amplifier is connected to the inverting input of the first operational amplifier to clamp the output signal of the first operational amplifier to maintain the baseline of the first operational amplifier output signal on line 215.

The filtered and clamped scrambled television signal from the output of the first operational amplifier is provided on line 215 to the sync detection and control circuit 201 and the A/D converter 205.

Figure 6:
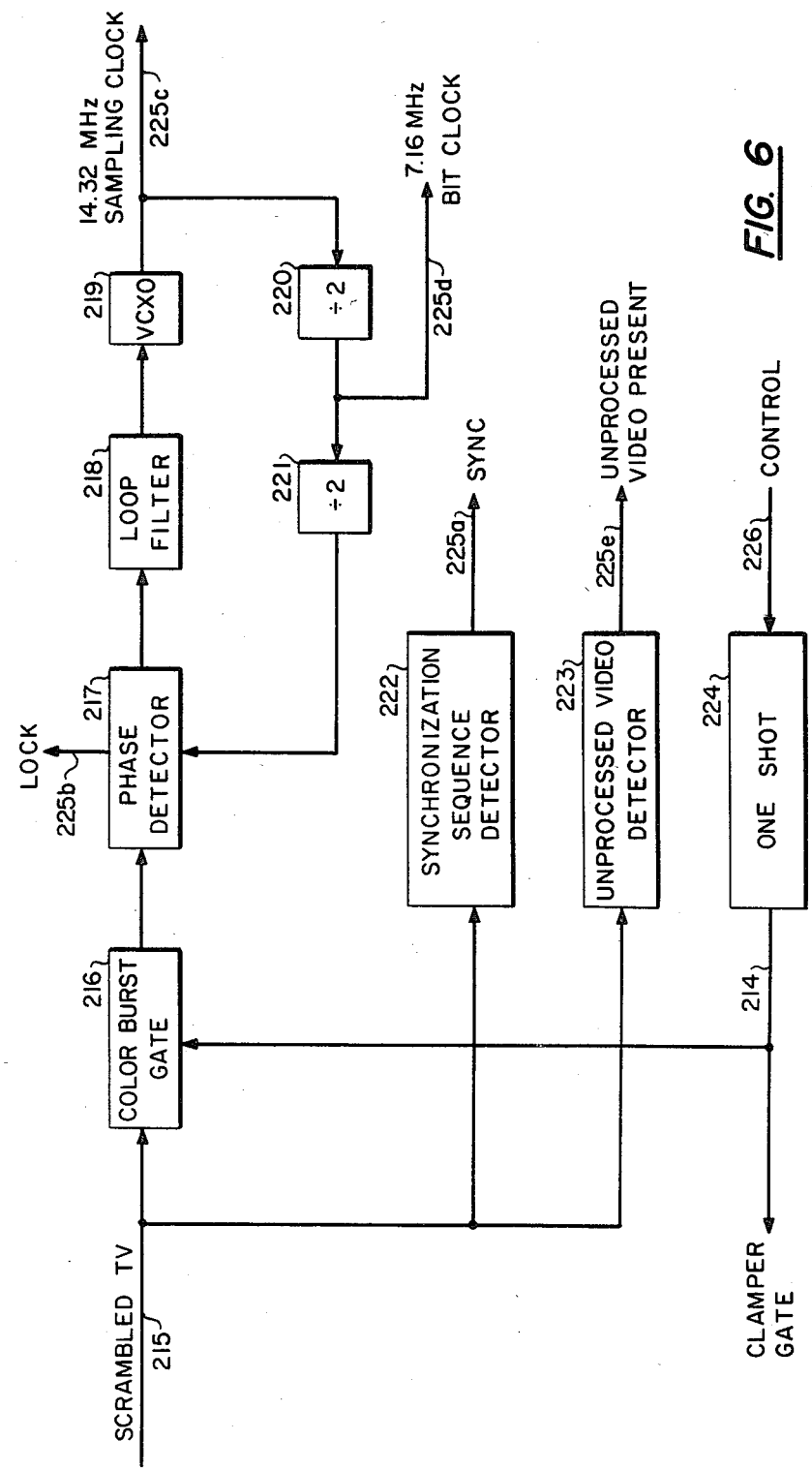
FIG. 6 is a block diagram of the sync detection circuit included in the system of FIG. 5.

Referring to FIG. 6, the sync detection and control circuit 201 in the descrambling system of FIG. 5 includes a sync burst gate 216, a phase detector 217, a loop filter 218, a voltage controlled crystal oscillator (VCXO) 219, a first divide-by-two counter 220, a second divide-by-two counter 221, a synchronization sequence detector 222, an "unprocessed video" detector 223 and a one shot pulse generator 224. The phase detector 217, loop filter 218, VCXO 219 and counters 220, 221 form a phase-locked loop that locks onto the 3.58 MHz 6-cycle sync burst component in the scrambled television signal received on line 215 to synchronize the operation of the descrambler with the scrambled TV signal on line 215. The VCXO 219 is tuned to 14.32 MHz. Generation of the sync burst component in the scrambled television signal is described above with reference to FIGS. 1 and 4b.

The synchronization sequence detector 222 provides a frame sync signal on line 225a to the control processor 202 in response to detection of a predetermined synchronization sequence in the scrambled TV signal on line 215. The predetermined synchronization sequence is present in line 1 of field 1 of the scrambled TV signal received on line 215, as described above with reference to FIG. 4c. When the descrambler is unsynchronized, detection of the first synchronization sequence in the signal on line 215 resets a divide-by-910 horizontal line sample counter in the control processor 202. The line sample counter controls circuitry in the control processor 202 that provides a control signal to the one shot pulse generator 224 on line 226, which in turn provides a gate signal pulse on line 214 to the sync burst gate 216. The gate signal pulse on line 214 rises at the beginning of the 6-cycle sync burst and enables the sync burst gate to provide the sync burst portion of the scrambled television signal on line 215 to the phase-locked loop.

The gate pulse signal on line 214 from the one shot pulse generator 224 is also provided to the sample and hold circuit in the buffer amplifier and clamper circuit 200.

When synchronization lock is achieved by the phase-locked loop, a lock signal is provided on line 225b to the control processor 202. When synchronization lock is achieved, the control processor 202 inhibits the reset to its internal line sample counter and monitors the frame sync signal on line 225a for loss of synchronization. If synchronization is lost the control processor 202 runs an algorithm to reacquire synchronization. When the frame sync signal on line 225a is active a horizontal line sync interrupt (HLSYNC) signal is provided within the control processor 202, which uses the HLSYNC signal to count horizontal lines, to time events, and to synchronize hardware and firmware events. When the frame signal on line 225a is active, video frame synchronization occurs because the synchronization sequence signal on line 215 occurs during line 1 of each frame.

The phase-locked loop provides a 14.32 MHz sampling clock signal on line 225c to the control processor 220 from the output of the VCXO 219, and further provides a 7.16 MHz bit clock signal on line 225d to the control processor 202 from the output of the first divide-by-two counter 220.

The "unprocessed video" detector 223 provides a signal on line 225e to the control processor 220 when a scrambled video signal is detected on line 215.

Referring again to FIG. 5, the demodulator and demultiplexer circuit 203 separates from the scrambled television signal on line 215 those audio and control signals that were pulse amplitude modulated and inserted into the portion of the scrambled television signal normally occupied by the horizontal sync pulse, as shown in FIG. 4b, and described above with reference to FIGS. 1 and 4b. The audio signals are provided on line 227 to the audio processor 204 and the control signals are demodulated and provided on line 228 to the control processor 202.

The control signals provided to the control processor on line 228 include the IV frame count signal, the encrypted channel key signal, the category address signal, the unique category key signal addressed to the particular descrambler and the subscriber key generation number, which are passed through the control processor 202 to a descrambler key distribution system (not shown) on lines 153, 154, 155, 156 and 157, respectively. The control signals provided on line 228 also include process control signals for controlling the operation of both the control processor 202 and the descrambler key distribution system, with the latter being passed to the scrambler key distribution system on line 159. The descrambler key distribution system is described by the aforementioned U.S. patent application by Gilhousen et al.

The control processor 202 detects message frame synchronization characters in the process control signal bit stream received on line 228, detects when address bytes are present within the message frame, and performs error checking by on each message. If the current byte is an address byte an address present bit will be set. The control processor 202 uses the three address bytes and the control byte to determine whether the incoming message is a message meant for the control processor 202 in the particular descrambler unit and determines whether the message is a control message or a data message. Control messages are used to send specific authorization and keying information to an individual descrambler unit. Data messages are messages that contain broadcast information, such as the count, key address and number signals on lines 153, 154, 155, 156 and 157.

The control processor 202 regulates the transfer of signals on line 228 from the demodulator circuit 203 by control signals provided to the demodulator circuit on line 229.

The A/D converter 205 converts the scrambled television signal on line 215 into a digital video information signal on line 230 at the sampling rate of 14.32 MHz to provide 910 9-bit samples per video line. A 14.32 MHz sampling clock signal is provided to the A/D converter 205 on line 225c from the synchronization and control circuit 201.

The video line buffer memory 206 stores the digital scrambled video information signal on line 230 in four groups of four scrambled video information lines each. Each scrambled video information line includes up to 776 8-bit samples of active video information. A first stored group includes information derived from four consecutive odd-numbered lines from the same video field. A second stored group includes information derived from the next four consecutive odd numbered lines from the same video field. A third stored group includes information derived from four consecutive even-numbered lines from the same video field, and the fourth stored group includes information derived from the next four consecutive even-numbered lines from the same video field. One group of scrambled video information lines derived from the odd-numbered lines is stored in the memory 206 while the information from the previously-stored group of scrambled lines derived from the odd-numbered lines is retrieved from the memory 206 to form a four-line group of odd-numbered descrambled video information lines on line 231. Likewise, one group of scrambled lines derived from the even-numbered lines is stored in the memory 206 while the information from the previously stored group of scrambled lines derived from the even-numbered lines is retrieved from the memory to form a four-line group of even-numbered descrambled video information lines on line 231. Video descrambling is accomplished by retrieving the active video information from the memory 206 in a sequence that is generally the reverse of the storage sequence in the video line buffer memory 53 in the scrambling system shown in FIG. 1.

The address counters 207 provide the respective addresses on line 232 to the memory 206 for storing and retrieving video information. These addresses are provided to the address counters 207 on line 233 via the address FIFO queue 208 and line 234 from the control processor 202 in accordance with the unique keystream provided to the control processor 202 on line 159.

The line buffer controller 209 provides clocking and control signals on lines 235 for synchronizing the operations of the address FIFO queue 208, the address counters 207, and the memory 206 in accordance with clocking and synchronization control signals provided on line 236 by the control processor 202. The control processor 202 provides the clocking and synchronization control signals on lines 236 in response to the clocking and synchronization control signals received on lines 225 from the sync detection and control circuit 201.

An exemplary embodiment of descrambling video information in accordance with the present invention is illustrated in FIG. 2. Descrambling also is accomplished within four-line groups. Two control bits of the keystream on line 159 designate a pair of lines within a given, descrambled four-line group as destinations for information stored in a corresponding pair of scrambled video information lines. In the embodiment of FIG. 2, lines 1 and 4 make up one pair in the descrambled group and the other pair in the descrambled group is made up of lines 2 and 3. Although each descrambled active video information line actually contains sixty-two twelve-sample segments, in FIG. 2 each descrambled line is shown as having only eight segments for simplicity of illustration. In the example of FIG. 2, the segments of descrambled line 1 are designated "a" through "h", and the segments of descrambled line 4 are designated "m" through "t". The descrambled lines retrieved from the memory 206 are identical to the lines of video information stored in the memory 53 in the scrambling system shown in FIG. 1. The relative lengths of the retrieved portions in each pair of descrambled lines is designated by six control bits in the keystream, which indicate a cutpoint "X" as being after a given number of segments from the beginning of the line.

Another five control bits of the keystream on line 44 designate the sequence within a four-line group in which the information is retrieved from the scrambled lines. Twenty-four different sequences are possible. Thus nineteen bits of the keystream are used every four video line times to select one of $3 \times 62 \times 24 = 276,768$ possible descrambling patterns. The descrambling pattern is defined by the unique keystream provided on line 159. The unique keystream provided on line 159 in the descrambler is a reproduction of the unique keystream provided on line 44 in the scrambling system of FIG. 1 In the preferred embodiment, the control processor 202 is programmed to provide retrieval addresses on line 234 to the address FIFO queue 55 in such a sequence that (a) the left portion of one line of a designated descrambled pair is retrieved from the right portion of one line of a corresponding scrambled pair; (b) the right portion of the one line of the designated descrambled pair is retrieved from the left portion of the other line of the corresponding scrambled pair; (c) the left portion of the other line of the designated descrambled pair is retrieved from the right portion of the other line of the corresponding scrambled pair; and (d) the right portion of the other line of the designated descrambled pair is retrieved from the left portion of the one line of the corresponding scrambled pair. In alternative preferred embodiments, the control processor may be programmed to effect alternative retrieval combinations between the corresponding scrambled line pairs and the designated descrambled line pairs.

In the example of FIG. 2, descrambled lines 1 and 4 are formed by (a) retrieving a portion consisting of segments a, b and c from the right end of scrambled line 2 to form the left end of descrambled line 1; (b) retrieving a portion consisting of segments d, e, f, g and h from the left end of scrambled line 4 to form the right end of descrambled line 1; (c) retrieving a portion consisting of segments m, n and o from the right end of scrambled line 4 to form the left end of descrambled line 4; and (d) retrieving a portion consisting of segments p, q, r, s and t from the left end of scrambled line 2 to form the right end of scrambled line 4. It is noted that the overlapping segment c from the left end of scrambled line 4 and the overlapping segment o from the left end of scrambled line 2 are discarded upon forming the descrambled lines.

Referring again to FIG. 5, the descrambled video information lines on line 231 are multiplexed by the multiplexer 212 with a nine-cycle color burst data signal on line 238 from the burst generator 210, and vertical and horizontal sync pulse data signals on line 239 from the sync restore generator 211. The operation of the multiplexer 212 is controlled by the control processor 202. The output of the multiplexer 61 is converted to an analog signal by the D/A converter 213 to provide a descrambled video signal on line 160. The descrambled video signal is a typical NTSC video signal as shown in FIG. 4a.

The burst generator 210 provides the nine-cycle color burst data signal on line 239 in response to a control signal on line 240 from the control processor 202. The color burst component of the descrambled video signal on line 160 is locked to and at the same frequency and phase as the sync burst component of the scrambled video signal on line 152 detected by the sync detection and control circuit 201.

The sync restore generator 211 provides the vertical and horizontal sync pulse data signal on line 239 in response to a control signal on line 241 from the control processor 202.

The control processor 202 causes the components of the descrambled TV signal on line 160 to occur during the intervals shown in FIG. 4a with reference to the beginning of the scrambled video line as determined in response to the synchronization control signals received on lines 225 from the sync detection and control circuit 201. The sequence of the components in the NTSC video signal shown in FIG. 4a is described above with reference to the description of the scrambling system shown in FIG. 1.

The scrambled audio signal in line 229 is digitized and descrambled by the audio processor 204 in accordance with an audio encryption portion of the keystream received on line 159 by the control processor 202 and passed through to the audio processor line 242. The audio processor 204 provides the descrambled audio signal on line 161.

The audio processor 204 time-expands each interval of the scrambled audio signal on line 227 corresponding to the duration of an NTSC video signal horizontal/sync pulse to an interval corresponding to the duration of a video signal line, and thereby reverses the time compression performed by the audio processor 49 in the scrambling system shown in FIG. 1. The audio processor 204 also descrambles the scrambled audio signal received on line 227 and provides a descrambled audio signal on line 161.

The time-expansion and timing functions of the audio processor 204 are synchronized and clocked in response to synchronization control and timing signals provided by the control processor on line 243 in response to synchronization control and timing signals received by the control processor 202 on lines 225 from the sync detection circuit 201 upon detecting the sync burst in the scrambled video signal on line 215.

The preferred embodiment of the audio processor 204 is described in more detail in the aforementioned U.S. patent application by Heller et al.

We claim:

1. A system for scrambling video information lines, comprising
   a memory;

storage means for sequentially storing groups of a plural predetermined number of said video information lines in the memory; and retrieval means for forming groups of a corresponding number of scrambled video information lines by retrieving the stored video information from the memory in a sequence different from the sequence within the stored group in which said information was stored;

characterized by the retrieval means comprising mens for retrieving a portion of a first stored video information line from a first position therein to form a portion of a first scrambled video information line occupyiny a second position therein; retrieving a portion of the first stored video information line from the corresponding second position therein to form a portion of a second scrambled video information line occupying a position therein other than the corresponding second position; and forming the portion of the first scrambled video information line occupying the corresponding first position therein by retrieving a portion of a stored video information line other than the first stored video information line from a position therein other than the corresponding first position.

2. A system according to claim 1, wherein the retrieval means is further characterized by means for varying the sequence of formation of said scrambled lines from one group to the next.

3. A system according to claim 2 wherein the retrieval means is further characterized by means for varying the combinations of stored video information lines within said stored groups for forming said first and second scrambled video information lines from one group to the next.

4. A system according to claim 3, wherein the retrieval means is further characterized by means for controlling the formation of the scrambled lines in response to a keystream, wherein each frame of the keystream includes a first set of control bits for designating combinations of stored video information lines as sources for corresponding combinations of scrambled video information lines in said formed group, and a second set of control bits for designating the sequence of formation of said scrambled video information lines in said formed group.

5. A system according to claim 4, further characterized by the keystream further including a third set of control bits for designating the respective lengths of said retrieved portions in each said combination of stored video information lines, whereby said lengths may vary from one combination to the next.

6. A system according to claim 2, wherein the retrieval means is further characterized by means for controlling the formation of the scrambled lines in response to a keystream, wherein each frame of the keystream includes a first set of control bits for designating the sequence of retrieval of said scrambled video information lines in said group.

7. A system according to claim 6, further characterized by means for varying the combinations of stored video information lines within said stored groups for forming said first and second scrambled video information lines from one group to the next and by the keystream further including a second set of control bits for designating the respective lengths of said retrieved portions in said combinations of stored video information lines, whereby said lengths may vary from one combination to the next.

8. A system according to claim 1 wherein the retrieval means is further characterized by means for varying the combinations of stored video information lines within said stored groups for forming said first and second scrambled video information lines from one group to the next.

9. A system according to claim 8, wherein the retrieval means is further characterized by means for controlling the formation of the scrambled lines in response to a keystream wherein each frame of the keystream includes a first set of control bits for designating combinations of stored video information lines as sources for corresponding combinations of scrambled video information lines in said group.

10. A system according to claim 9, further characterized by the keystream further including a second set of control bits for designating the respective lengths of said retrieved portions in said combinations of stored video lines, whereby said lengths may vary from one combination to the next.

11. A system according to claim 1, characterized by the retrieving means forming the scrambled video information lines by retrieving overlapping portions from the stored video information lines.

12. A system according to claim 1, characterized by means for adjusting the values of the adjacent extremities of the retrieved portions of each scrambled video information line to obscure the positions of said adjacent extremities in the scrambled lines.

13. A system for scrambling video information lines, comprising a memory;

storage means for sequentially storing groups of an even predetermined number of said video information lines in a memory; and retrieval means for forming groups of a corresponding number of scrambled video information lines by retrieving the stored video information from the memory in a sequence different from the sequence within the stored group in which said information was stored;

characterized by the retrieval means comprising means for retrieving a first length portion of a first stored video information line from one end position therein to form a first length portion of a first scrambled video information line oecupying the opposite end position therein; retrieving a second length portion of the first stored video information line from the corresponding opposite end position therein to form a second length portion of a second scrambled video information line occupying the corresponding one end position therein; retrieving a second length portion of a second stored video information line from the corresponding opposite end position therein to form a second length portion of the first scrambled video information line occupying the corresponding one end position therein; and retrieving a first length portion of the second stored video information line from the corresponding one end position therein to form a first length portion of the second scrambled video information line occupying the corresponding opposite end position therein.

14. A system according to claim 13, wherein the retrieval means is further characterized by means for varying the pairings of stored video information lines within said stored groups for forming said first and second scrambled video information lines from one group to the next.

15. A system according to claim 14, wherein the retrieval means is further characterized by means for controlling the formation of the scrambled lines in response to a keystream, wherein each frame of the keystream includes a first set of control bits for designating pairs of said first and second stored video information lines as sources for corresponding pairs of scrambled video information lines in said formed group.

16. A system according to claim 15, further characterized by the retrieval means further comprising means for varying the sequence of formation of said scrambled lines from one group to the next; and by each frame of the keystream including a second set of control bits for designating the sequence of formation of said scrambled video information lines in said formed group.

17. A system for descrambling scrambled video information lines, comprising a memory;

storage means for sequentially storing groups of a plural predetermined number of said scrambled video information lines in the memory; and retrieval means for forming groups of a corresponding number of descrambled video information lines by retrieving the stored video information from the memory in a sequence different from the sequence within the stored group in which said information was stored;

characterized by the retrieval means comprising means for retrieving a portion of a first scrambled video information line from a first position therein to form a portion of a first descrambled video information line occupying a second position therein; retrieving a portion of the first scrambled video information line from the corresponding second position therein to form a portion of a second descrambled video information line occupying a position therein other than the corresponding second position; and forming the portion of the first descrambled video information line occupying the corresponding first position therein by retrieving a portion of a scrambled video information line other than the first scrambled video information line from a position therein other than the corresponding first position; and means for controlling the formation of the descrambled lines in response to a keystream, wherein each frame of the keystream includes a first set of control bits for designating combinations of descrambled video information lines as destinations for information stored in corresponding combinations of scrambled video information lines in said stored group.

18. A system according to claim 17, further characterized by the keystream further including a second set of control bits for designating the sequence of retrieval of information from said scrambled video information lines in said stored group.

19. A system according to claim 18, characterized by the keystream further including a third set of control bits for designating the respective lengths of said retrieved portions in said combinations of descrambled video information lines.

20. A system according to claim 17, further characterized by the keystream further including a second set of control bits for designating the respective lengths of said retrieved portions in said combinations of descrambled video lines.

21. A system for descrambling scrambled video information lines, comprising a memory;

storage means for sequentially storing groups of a plural predetermined number of said scrambled video information lines in the memory; and retrieval means for forming groups of a corresponding number of descrambled video information lines by retrieving the stored video information from the memory in a sequence different from the sequence within the stored group in which said information was stored;

characterized by the retrieval means comprising means for retrieving a portion of a first scrambled video information line from a first position therein to form a portion of a first descrambled video information line occupying a second position therein; retrieving a portion of the first scrambled video information line from the corresponding second position therein to form a portion of a second descrambled video information line occupying a position therein other than the corresponding second position; and forming the portion of the first descrambled video information line occupying the corresponding first position therein by retrieving a portion of a scrambled video information line other than the first scrambled video information line from a position therein other than the corresponding first position; and means for controlling the formation of the descrambled lines in response to a keystream, wherein each frame of the keystream includes a first set of control bits for designating the sequence of retrieval of information from said scrambled video information lines in said stored group.

22. A system according to claim 21, further characterized by the keystream further including a second set of control bits for controlling the respective lengths of said retrieved portions in said combinations of descrambled video information lines.

23. A system according to claim 21, characterized by the segments in the scrambled video information lines corresponding to sequentially overlapping segments in the descrambled video information lines.

24. A system for descrambling scrambled video information limes, comprising a memory;

storage means for sequentially storing groups of an even predetermined number of said scrambled video information lines in the memory; and retrieval means for forming groups of a corresponding number of descrambled video information lines by retrieving the stored video information from the memory in a sequence different from the sequence within the stored group in which said information was stored;

characterized by the retrieval means comprising means for retrieving a first length portion of a first scrambled video information line from one end position therein a form a first length portion of a first descrambled video information line occupying the opposite end position therein; retrieving a second length portion of the first scrambled video information line from the corresponding opposite end position therein to form a second length portion of a second descrambled video information line occupying the corresponding one end position therein; retrieving a second length portion of a second scrambled video information line from the corresponding opposite end position therein to form a second length portion of the first descrambled video information line occupying the corresponding one end position therein; and retrieving a first length portion of the second scrambled video information line from the corresponding one end position therein to form a first length portion of the second descrambled video information line occupying the corresponding opposite end position therein; and means for controlling the formation of the scrambled lines in response to a keystream, wherein each frame of the keystream includes a first set of control bits for designating pairs of said first and second descrambled video information lines as destinations for information stored in corresponding pairs of scrambled video information lines in said stored group.

25. A system according to claim 24, further characterized by the keystream further including a second set of control bits for designating the sequence of retrieval of information from said scrambled video information lines in said stored group.

* * * * *

UNITED STATES PATENT AND TRADEMARK OFFICE
CERTIFICATE OF CORRECTION

PATENT NO. : 4,563,702

DATED : January 7, 1986

INVENTOR(S) : Jerrold A. Heller and Woo H. Paik

It is certified that error appears in the above-identified patent and that said Letters Patent is hereby corrected as shown below:

Column 15, line 14, change "occupyiny" to --occupying--.

Column 18, line 67, after "position therein", change "a" to --to--.

Signed and Sealed this

Twenty-fifth Day of March 1986

[SEAL]

Attest:

Attesting Officer

DONALD J. QUIGG

Commissioner of Patents and Trademarks